US011203043B2

(12) United States Patent
Pottier et al.

(10) Patent No.: US 11,203,043 B2
(45) Date of Patent: Dec. 21, 2021

(54) SEPARATION DEVICE

(71) Applicant: KADANT LAMORT, Vitry-le-Francois (FR)

(72) Inventors: Stephan Pottier, Marolles (FR); Alain Fernandez De Grado, Les Rivieres Henruel (FR)

(73) Assignee: KADANT LAMORT, Vitry-le-Francois (FR)

( * ) Notice: Subject to any disclaimer, the term of this patent is extended or adjusted under 35 U.S.C. 154(b) by 314 days.

(21) Appl. No.: 16/062,811

(22) PCT Filed: Jan. 20, 2017

(86) PCT No.: PCT/FR2017/050125
§ 371 (c)(1),
(2) Date: Jun. 15, 2018

(87) PCT Pub. No.: WO2017/125692
PCT Pub. Date: Jul. 27, 2017

(65) Prior Publication Data
US 2020/0261944 A1 Aug. 20, 2020

(30) Foreign Application Priority Data

Jan. 22, 2016 (FR) .................................... 16 50528
May 13, 2016 (FR) .................................... 16 54287

(51) Int. Cl.
*B07B 13/18* (2006.01)
*B01D 29/66* (2006.01)
(Continued)

(52) U.S. Cl.
CPC .............. *B07B 13/18* (2013.01); *B01D 29/66* (2013.01); *B07B 1/50* (2013.01); *B07B 13/16* (2013.01); *D21D 5/04* (2013.01); *B07B 2230/01* (2013.01)

(58) Field of Classification Search
CPC ........... B07B 13/18; B07B 13/16; B07B 1/50; D21D 5/04; B01D 29/66
See application file for complete search history.

(56) References Cited

U.S. PATENT DOCUMENTS

| 4,153,552 A | * | 5/1979 | Muther | .................. | B01D 37/02 |
| | | | | | 210/108 |
| 4,284,500 A | * | 8/1981 | Keck | ...................... | B01D 29/15 |
| | | | | | 209/250 |

(Continued)

FOREIGN PATENT DOCUMENTS

| DE | 1249060 B | * | 8/1967 | ............... B07B 1/00 |
| DE | 1249060 B | | 8/1967 | |
| GB | 524533 A | | 8/1940 | |

OTHER PUBLICATIONS

Ventura, C., Garcia, F., Ferreira, P. and Rasteiro, M, "Flow Dynamics of Pulp Fiber Suspensions", TAPPI Journal, Aug. 2008, pp. 20-26.

*Primary Examiner* — Patrick H Mackey
(74) *Attorney, Agent, or Firm* — Craft Chu PLLC; Andrew W. Chu

(57) ABSTRACT

A device for separating the constituents of a fluid medium includes an element for separating the constituents, helping to define, upstream and/or downstream from the separation element, a closed chamber, to which at least one conduit is connected. The conduit includes at least one activatable sealing device, the activation of which is capable of at least partially closing and opening the conduit. The device also includes a controller for the activation of the sealing device, controlling the closing and opening, at least partially, of the conduit cyclically, at a frequency greater than 0.008 Hz.

4 Claims, 4 Drawing Sheets

(51) Int. Cl.
*B07B 1/50* (2006.01)
*B07B 13/16* (2006.01)
*D21D 5/04* (2006.01)

(56) References Cited

U.S. PATENT DOCUMENTS

| | | | |
|---|---|---|---|
| 4,532,961 A * | 8/1985 | Walton | F16K 3/085 137/625.31 |
| 5,114,574 A * | 5/1992 | Barry | A47L 9/20 15/321 |
| 6,348,130 B1 | 2/2002 | Egan | |
| 8,002,983 B2 * | 8/2011 | Wanni | B01D 29/01 210/304 |
| 9,943,786 B2 * | 4/2018 | Ekholm | B01D 29/66 |
| 2009/0050581 A1 * | 2/2009 | Kaske | B01D 21/30 210/797 |
| 2012/0074074 A1 * | 3/2012 | Lean | B01D 29/6476 210/798 |

* cited by examiner

SEPARATION DEVICE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention falls within the field of separating constituents of a fluid medium, said medium being able to be liquid, gaseous or solid.

"Fluid" refers to a deformable medium. According to the invention, the separation is a differential separation of constituents of the medium based on their size, in particular three-dimensional, i.e., their geometric bulk in space. Consequently, the segregation of the constituents will be done based on their size, and based on their movement behavior in said fluid medium.

The invention particularly relates to a device for separating constituents of a fluid medium.

Such a device will in particular be applicable in the field of recycling and/or treatment of industrial waste, in particular in the field of food wrappings such as paper.

More generally, the field of preparing paper pulp from new or recycled cellulose to allow the production of writing paper, newsprint paper, sanitary paper, wrapping paper, etc. is affected by the invention.

2. Description of Related Art Including Information Disclosed Under 37 CFR 1.97 and 37 CFR 1.98

In a known manner, the separating devices of the prior art comprise a tub equipped with a perforated sieve. This sieve allows separation of the various elements of the fluid mixture based on their size. The fluid mixture arrives upstream from said sieve; part of this fluid mixture, called "accepted part", passes through the sieve, while another part, called "retained part", is blocked on said sieve.

Depending on the type of sieve, the caliber of these perforations, the type of fluid mixture to be separated, the pressure upstream and the pressure downstream from the sieve, the surface upstream from the sieve is subject to a risk of clogging. The clogging of the sieve prevents the separating operation from continuing. Indeed, a clump of constituents of the fluid mixture may clog the sieve and prevent it from performing a selective separation function. The presence of this clump will stop the circulation and block the passage of the accepted parts through the sieve. More particularly, due to solid constituents present in suspension in the fluid medium and the size of which is of the same order of magnitude as the size of the perforations, these constituents may aggregate on or in the perforations and make the latter inoperative.

One solution to avoid or reduce clogging is to increase the caliber of the perforations of the sieve, but this would be detrimental to the quality of the differential separation operation based on the size, which, in the paper mill field, would not make it possible to obtain a sufficient quality and/or quantity of paper pulp fibers free of contaminants.

The traditional solution to avoid this clogging without modifying the caliber of the perforations of the sieve is to use a rotor equipped with rotary unclogging blades. Said rotor is placed near the sieve, often upstream, within the separating tub, with or without being under pressure. The movement of the blades of the rotor, near the sieve, will locally generate a counter-current for the stream of pulp passing through the sieve. This counter-current will make it possible to break down the clump of constituents of the medium clogged on the sieve. This phenomenon is commonly called "unclogging effect by rotor".

However, the solution of the rotor with unclogging blades has several drawbacks. The number and design of the blades are fixed, as a result of which the frequency, intensity and unclogging duration can only be modified by changing the rotation speed of the rotor. One solution to modify these parameters consists of accelerating the rotation speed of the rotor. Yet this solution generates excess energy consumption and a decrease in separating "selectivity", i.e., the ability to separate the constituents based on their size. On an industrial scale, a decrease in separating selectivity causes excess costs, as well as faster wear, in particular at the blades. Thus, the excess costs may relate to the initial investment, the increased energy consumption, the quality of the separation and an increase in the frequency of complex maintenance operations.

Furthermore, said rotor has the drawback of being placed directly within the tub and coming into contact with the medium to be separated. Thus, there is a risk of the medium to be separated being contaminated by the rotor itself. Furthermore, if the rotor becomes worn, it is necessary to stop the separating operation taking place in the tub to change part or all of the rotor. The stopping of the separating operation in the tub to change a worn or defective rotor is an economic loss in case of industrial production.

The use of the rotor inside the tub to unclog the separating sieve is therefore not a satisfactory solution because it is expensive, consumes considerable energy, requires the separating operation to be stopped in case of wear and has a complicated mechanical design.

There is therefore reason to find an alternative solution that is effective, preferably applicable during the separating operation, to more effectively unclog the sieve and more effectively separate the constituents of the fluid medium.

The solutions of the prior art for unclogging the sieve are therefore not satisfactory because they do not make it possible to adjust the three unclogging parameters independently of one another, namely the frequency, duration and intensity. Yet from an industrial standpoint, it is necessary to be able to adjust and regulate these three parameters for example based on the wear of the sieve, the calibration of its perforations, the contamination of the medium to be separated and the desired production. It is desirable to find an alternative solution to improve the performance of the existing installations for separating constituents of a fluid medium, but also to reduce their size and/or operating cost depending on the field of use.

BRIEF SUMMARY OF THE INVENTION

The present invention aims to offset the drawbacks of the state of the art by proposing a device for separating constituents of a fluid medium, contributing to delimiting, upstream and/or downstream from said separating element, a closed chamber, to which at least one conduit C is attached.

Thus, in a manner specific to the invention:
said conduit comprises at least one activatable sealing means, the activation of which is capable of at least partially closing and opening said conduit C; and
said device comprises means for controlling the activation of said sealing means, capable of controlling the closing and opening, at least partially, of said conduit C cyclically, at a frequency greater than 0.008 Hz.

Furthermore, according to other features:
said means for controlling the activation of said sealing means are able to command the closing and opening, at least partially, of said conduit C cyclically, at a frequency greater than 0.03 Hz;
the device comprises means for managing said control means, said management means being capable of performing a cycle, each cycle comprising at least one activation phase PA of the sealing means and at least one non-activation phase PI of said sealing means;
said sealing means comprise at least one element E intended to seal, or not seal, said conduit C completely or partially, based on its position relative to said conduit C and its geometric shape relative to said conduit C, said element E being fastened on a movable support means;
the sealing means comprise at least one flap fastened on a rotatable disc, said management means being suitable, or not suitable, for the mobility of the disc through management means, such that said flap:
Is movable continuously to seal, or not seal, said conduit C at least partially, during an activation phase PA of said sealing means,
Or
Is immobile in a fixed position, sealing or not, said conduit C at least partially, during a non-activation phase PI of said sealing means;
an activation phase PA of the sealing means comprises at least one closing and opening sequence S, defined by the closing followed by the opening, at least partial, of said conduit C, said sequence S having a duration shorter than 1 min., preferably shorter than 30 s, for example shorter than 15 s;
said management means of said control means are suitable for the activation phase PA to last less than 50% of the time to carry out a cycle and/or the activation phase PA lasts less than 2 min., preferably less than 1 min., for example 30 s;
said management means of said control means are suitable for the closing and opening amplitude, at least partial, of said conduit C by the sealing means during an activation phase PA to be greater than or equal to 60, 40 or at least 20%.

The present invention also relates to an unclogging method implementing the device according to the invention, including the following steps:
depositing said fibrous suspension or fluid medium M on the separating element;
generating a pressure variation at the interface of the separating element in order to unclog the latter, through the activation of said sealing means according to a series of cycles at a frequency greater than 0.008 Hz, each cycle including at least one total or partial closing and opening sequence S.

BRIEF DESCRIPTION OF THE SEVERAL VIEWS OF THE DRAWINGS

Other features and advantages of the invention will emerge from the following detailed description of non-limiting embodiments of the invention, in reference to the appended figures.

DETAILED DESCRIPTION OF THE INVENTION

Figure 1C:
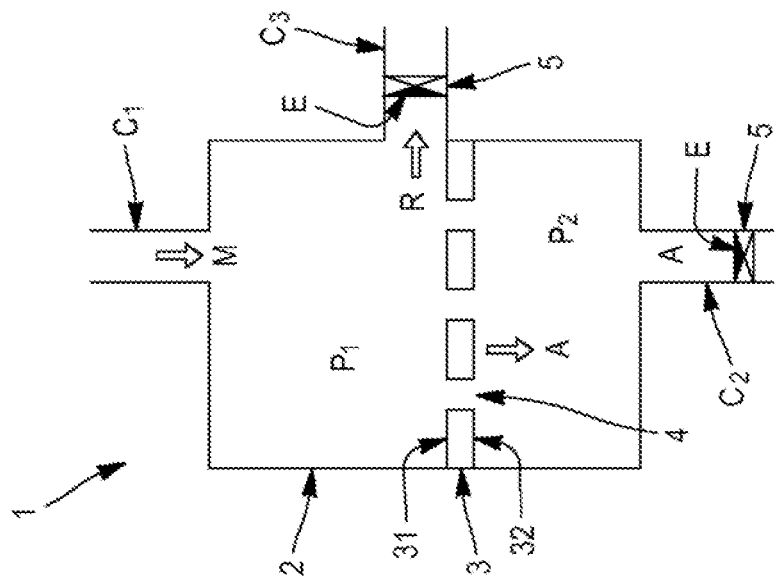
FIG. 1 is a schematic view, showing the device 1 according to the invention according to three different embodiments, respectively 1A, 1B, 1C.

The present invention relates to a device 1 for separating constituents of a fibrous suspension or fluid medium M, visible in FIG. 1. Said fibrous suspension or medium M can be in liquid and/or gaseous and/or solid form.

According to the invention, the separation is done according to a size differential of said constituents of the fibrous suspension or medium M.

Said device 1 can be used in the field of filtration, purification, fractionation, thickening, for example cellulose fibers or water filtration.

In particular, the separating device 1 may be used in the paper field, in particular the recycling of recovered paper. This paper, i.e., the cellulose fibers, will have to be purified to eliminate the unwanted constituents. For example, in the field of recycling paper, the unwanted constituents may be metal materials, or plastic or mineral materials. In this case, the fibrous suspension or medium M consists of a mixture having several unwanted constituents, which one wishes to separate from the cellulose fibers.

The separating device 1 may also be used, in particular in a purification station, to treat water to separate the polluting or nonpolluting waste therefrom, in particular that having a large caliber. For example, the water to be treated may contain mineral materials, such as stones, dirt or other unwanted elements commonly called "material in suspension".

The device 1 according to the invention comprises at least one separating element 3 for separating constituents of the fluid medium M. Said separating element 3 has a first face 31 called "upstream" coming into contact with said medium M, as opposed to a second face 32 called "downstream".

Said separating element 3 comprises one or several perforations 4 allowing or not allowing the constituents to pass from the medium M through said separating element 3.

The term "perforations 4" refers to calibrated openings 4 in the separating element 3, the caliber of these openings depending on the size of the various constituents of the medium M that one wishes to separate and the desired degree of segregation. For example, the perforation may be a slit measuring 0.15 mm wide, holes with 2 mm diameters or a 150 Mesh cloth.

The constituents of the medium M that traverse the perforations 4, passing through it by the upstream first face 31 and leaving it through the downstream second face 32, are the accepted parts "A".

The constituents of the medium M that do not traverse the perforations 4 and that remain retained on the upstream first face 31 of the separating element 3 are the rejected parts "R".

Figure 1B:
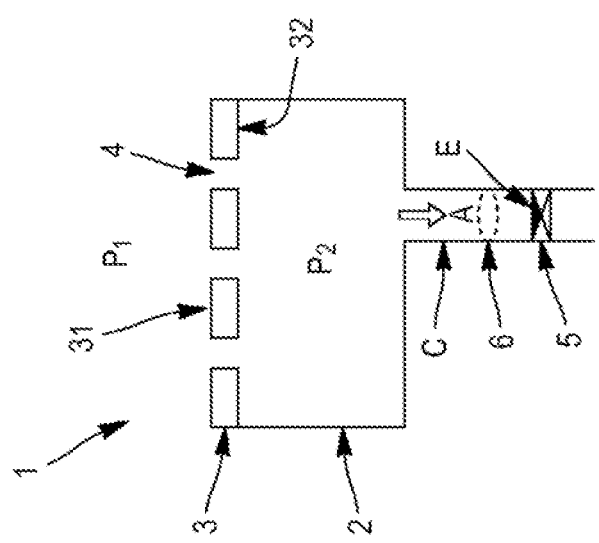
Figure 1A:
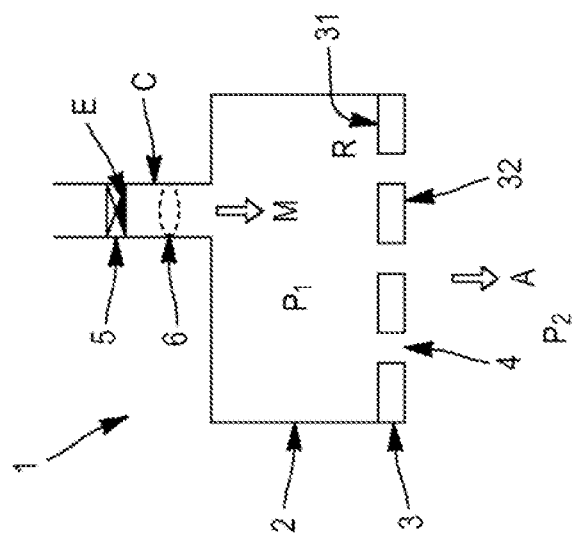

As shown in FIGS. 1A to 1C, said separating element 3 contributes to delimiting a closed chamber 2 to which at least one conduit C is connected. The arrows indicated in these figures show the movement direction of the accepted parts A and/or the rejected parts R and/or the medium M in the device 1.

According to the invention, said conduit C has an opening area 6 allowing the constituents to pass.

According to one particular embodiment, visible in FIG. 1A, the closed chamber 2, connected to at least one conduit C, is upstream from the separating element 3. In this embodiment, the conduit C can be used both at the medium M supply inlet and the reject R discharge.

According to another particular embodiment, visible in FIG. 1B, the closed chamber 2, connected to at least one conduit C, is downstream from the separating element 3. In this case, the conduit C is used as the discharge conduit for the accepted parts A.

According to another favored embodiment of the invention, visible in FIG. 1C, in particular applicable in the field of preparing paper pulp, said separating element 3 is inside the closed chamber 2. Preferably, this separating element 3 is positioned at the center of the closed chamber 2. In this favored embodiment, the closed chamber 2 has at least three conduits C, including a medium M supply inlet conduit C1, a discharge conduit C2 for the accepted parts A and a discharge conduit C3 for the rejected parts R.

According to the invention, "P1" will refer to the pressure upstream from said separating element 3. Likewise, "P2" will refer to the pressure downstream from said separating element 3.

According to the invention, the separation of the constituents from the fluid medium M in the category of accepted parts A or rejected parts R is a separation done by:
  supplying fluid medium M upstream from the separating element 3;
  applying a pressure P1 upstream from said separating element 3;
  applying a pressure P2 downstream from said separating element 3;
  making sure that the pressure P1 is greater than the pressure P2.

The expression "applying a pressure" means that the pressure is obtained by using a pressurization or depressurization means, for example a pump, a compressor, a water column or any other technical solution obvious to one skilled in the art. The pressure can also be obtained by using the atmospheric pressure.

The supply allows the fluid medium M to come directly into contact with the face 31 of the separating element 3. The pressure deviation between P1 and P2 allows the accepted parts A to cross through said perforations 4.

The separation of the constituents of the fluid medium M, able to traverse the separating element 3, is in particular possible if P1 is greater than or equal to P2.

The separation of the constituents from the fluid medium M is in particular possible owing to the pressure deviation existing between the upstream and downstream of said separating element 3. With the device 1 according to the invention, this pressure deviation is found over the entire surface of the separating element 3; the action is therefore global.

This is an advantage relative to the device with rotor alone of the state of the art, which generates a pressure deviation only in the location of the sieve where the blades of the rotor are found. In the prior art, the rotor only causes a local pressure deviation action, unlike the device 1 of the invention.

It has been noted that if the deviation of the pressure values between P1 and P2 is insufficient, the perforations 4 of the separating element 3 may become plugged, partially or completely, with constituents of the fluid medium M. Constituents of the medium M then form one or several clumps of constituents clogging the separating element 3, deteriorating and/or preventing the passage of the accepted parts A. Said clump(s) of constituents of medium M may be present, partially or completely, on the face 31 of the separating element 3, and thus prevent the separation between accepted parts A and rejected parts R from being done correctly.

In case of complete or partial clogging of the surface of the separating element 3, the separation between the accepted parts A and the rejected parts R of the medium M can no longer be done effectively.

According to one specificity of the invention, the device 1 comprises sealing means 5 of the conduit C that make it possible to modify the pressure deviation between P1 and P2 enough to allow unclogging of the separating element 3. More specifically, the clogging conditions of the separating element 3 are associated with the pressure deviation between P1 and P2. The objective of the invention is to modify these pressure conditions by acting on the sealing rate of the conduit C. Thus, the passage of fluid in the conduit(s) C connected to the chamber 2 is modified by the invention, which has the favorable result of changing the pressure conditions P1 and P2 and therefore the clogging conditions.

Said sealing means 5 are outside the closed chamber 2 of the device 1 according to the invention, since they are positioned inside the conduit C. These sealing means 5 make it possible to act and modulate the pressure present inside the closed chamber 2.

According to the invention, the sealing means 5 comprise at least one element E fastened on a movable support 51. Said element E is intended to seal, or not seal, completely or partially, said conduit C, based on its position and its geometric shape relative to said conduit C.

The partial or total sealing of the conduit C will make it possible to change the passage flow rate of the constituents, for example of the accepted parts A or rejected parts R, through the opening area 6 of said conduit C.

The modification of said passage flow rate within said conduit C, or even the cancellation of this passage flow rate at a moment t, during the separation process of the constituents will generate a variation of the internal pressure P1 and/or P2 within the closed chamber 2.

Thus, the total or partial sealing of the conduit C, coupled with the variation of the internal pressure within the closed chamber 2, makes it possible to vary the deviation between the pressures P1 and P2, upstream and downstream from the separating element 3. The variation of this pressure deviation between P1 and P2 is the phenomenon resulting from the sealing of the conduit C. This modification phenomenon of the pressure deviation between P1 and P2 can be done during the separation process.

This change phenomenon of the pressure deviation between P1 and P2 resulting from the total or partial sealing of the conduit C is reflected by a change in the pressures exerted at the interface and at the separating element 3.

More particularly, a sufficient change in the pressure deviation between P1 and P2, optionally assisted by the action of a rotor with blades, and/or assisted by the action of a supply of the medium M, and/or assisted by the action of a stream of an auxiliary fluid, for example dilution water, makes it possible to lift the clump of constituents of the medium M able to clog the face 31 of the separating element 3 or able to clog the perforations 4.

Thus, the presence of the sealing means 5 generates a variation in the deviation between P1 and P2, through a change in the passage flow rate in the conduit C. As a result, the presence of the sealing means 5 makes it possible to participate in unclogging the separating element 3.

The invention is particularly effective in case of the transport of a fluid considered to be incompressible or having a density greater than 0.5 kg/L. In the case of paper pulp, the fluid primarily contains water and has a density of about 1 kg/L, which makes the sealing effect of the conduit C very effective.

According to another particularity of the invention, the sealing means 5 are activatable, their activation being capable of opening or closing, at least partially, the conduit C using the element E.

According to the invention, the activation of the sealing means 5 is reflected by the continuous mobility of the support means 51. On the contrary, the inactivation of the sealing means 5 is reflected by a fixed and immobile position of the support means 51.

According to one specificity of the invention, the device 1 comprises control means 7 for the activation of the sealing means 5, i.e., means 7 that control the mobility of the support means 51 of the element E.

Thus, said control means 7 make it possible to control the closing and opening, at least partial, of said conduit C.

In other words, the control means 7 activate or deactivate the sealing means 5, i.e., they do or do not generate the mobility of the support means 51, therefore the movement of the element E relative to the conduit C.

More specifically, to effectively unclog the clump present on the separating element 3, said control means 7 control the closing and opening, at least partial, of said conduit C cyclically, according to a frequency greater than 0.008 Hz or a time shorter than 2 min. Preferably, said frequency is greater than 0.016 Hz, corresponding to a cycle time less than or equal to 1 min.

Advantageously, said frequency is greater than 0.033 Hz, corresponding to a cycle time less than or equal to 30 s.

According to the present invention, the device 1 also comprises management means 8 for said control means 7, said management means 8 being capable of performing an activation cycle.

For example, if the frequency of these cycles is greater than 0.033 Hz, this means that each cycle takes place over a duration shorter than 30 seconds. The period of each cycle is then less than 30 seconds. Thus, every 30 seconds, a new cycle starts.

Figure 2:
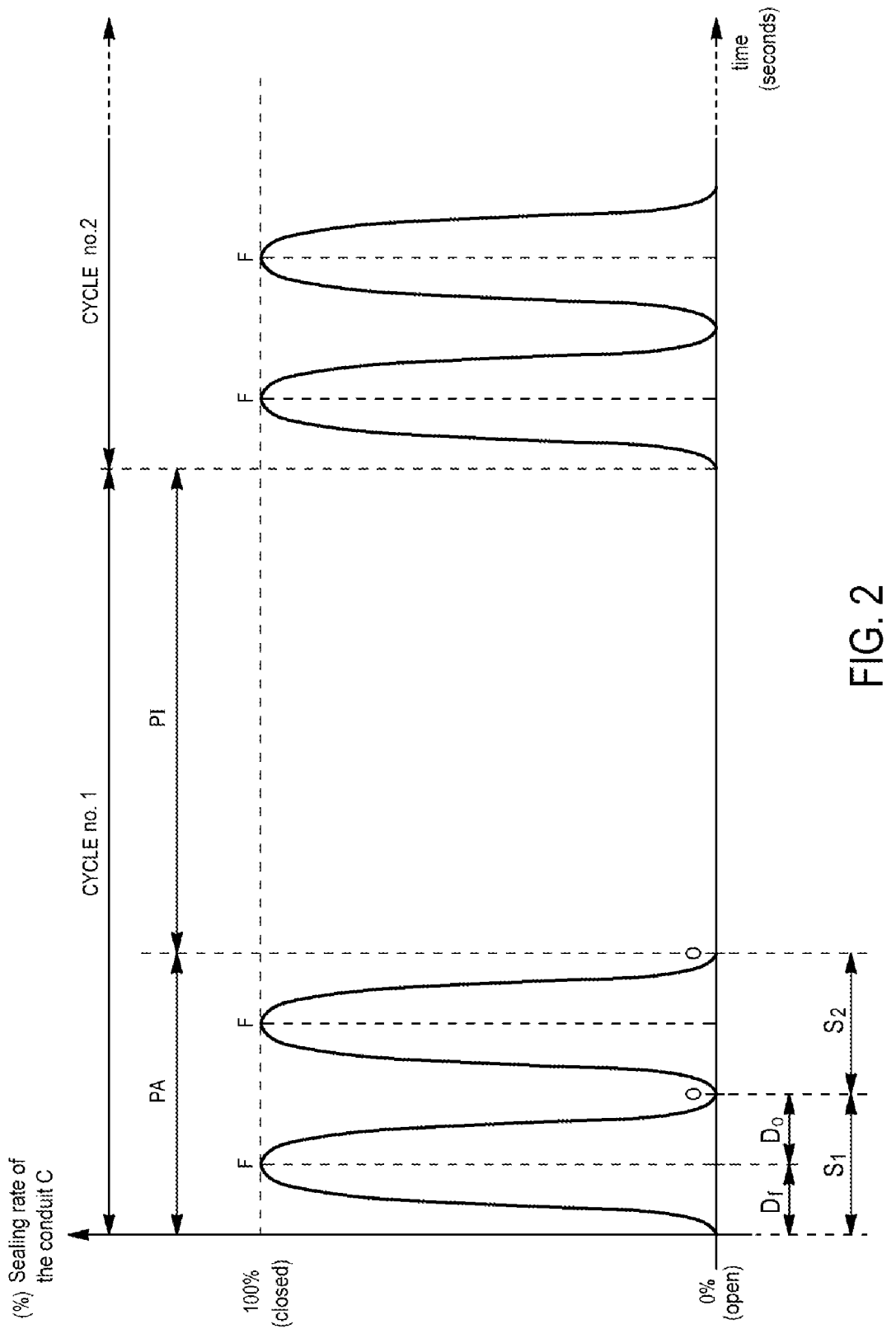
FIG. 2 is a schematic view showing, as a function of time, the sealing rate of the conduit C by the element E, i.e., the sealing intensity of the conduit varying between 0 and 100%, according to a first particular embodiment comprising a series of two identical cycles, comprising a non-activation phase of the sealing means and an activation phase of the sealing means, said activation phase comprising two opening and closing sequences.
Figure 4:
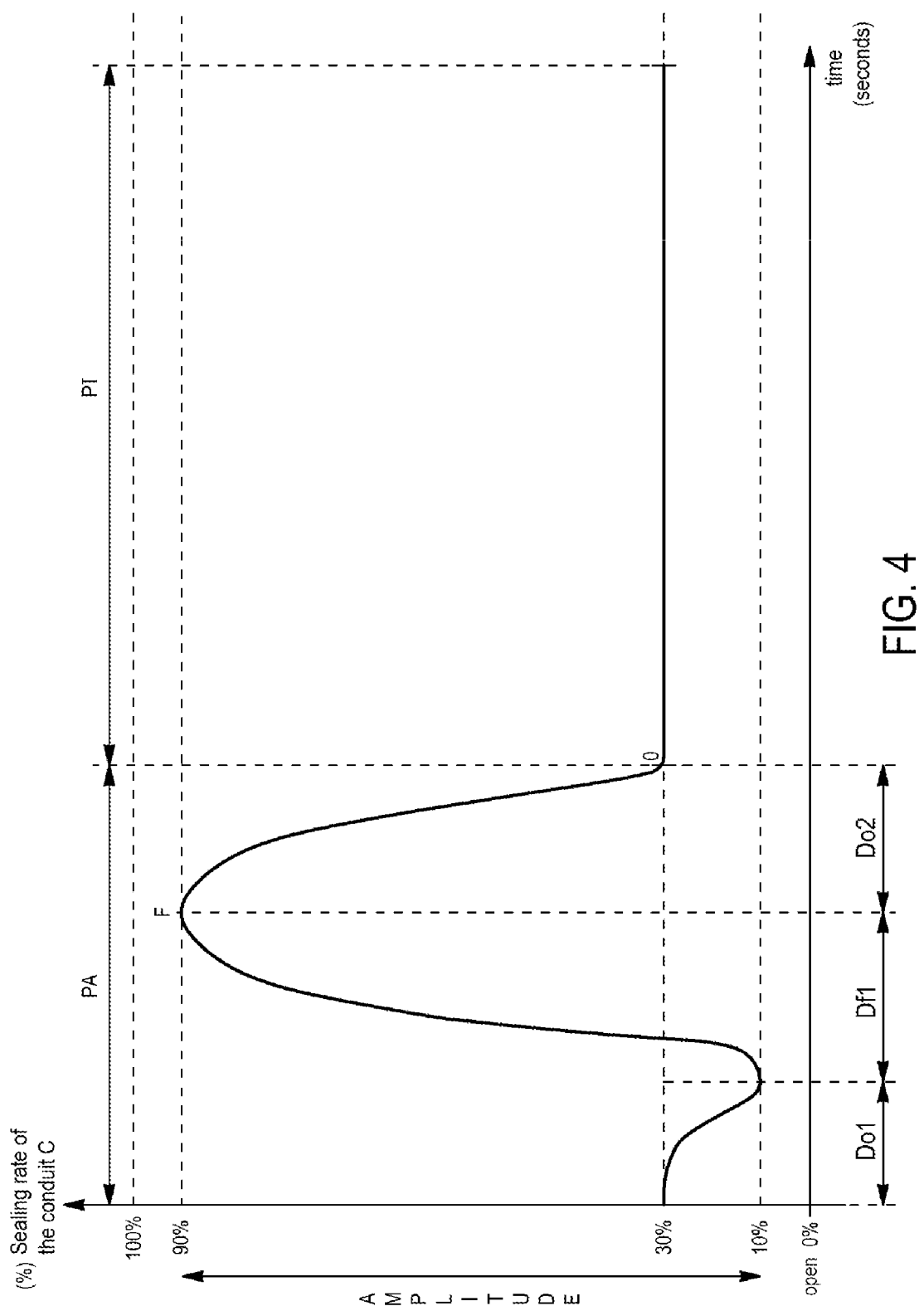
FIG. 4 is a schematic view, showing another particular operating mode in which the sealing rate of the conduit C by the element E, as a function of time, varies between limits comprised between 30 and 90%, and in which an activation cycle comprises an activation phase and an inactivation phase, said activation phase comprising a sequence of opening, closing, followed by opening.

Each cycle comprises at least one activation phase PA of the sealing means 5 and at least one non-activation phase PI of said sealing means 5, as illustrated in FIG. 2 or FIG. 4.

FIG. 2 illustrates an example evolution of the sealing rate of the conduit C as a function of time, with two consecutive sealing cycles of the conduit C.

The sealing rate of the conduit C represents the ratio of the area of the element E sealing the conduit C divided by the total area 6 of the conduit C. Thus, a sealing rate of 10% means that, if the 100% open conduit C has an area of 0.1 $m^2$, the element E Seals 0.01 $m^2$ of the area of the conduit C and a fluid passage section of 0.09 $m^2$ remains. Likewise, a sealing rate of 90% means that only 0.01 $m^2$ of passage section remains and that the element E is sealing 0.09 $m^2$ of the area of the conduit C.

This sealing rate can be associated with the effectiveness of the desired unclogging effect, applied on the separating element 3. Indeed, the more or less significant sealing of the conduit C modifies the fluid flow conditions in said conduit C, which influence the aforementioned pressures P1 and P2, and therefore modify the unclogging and separating effect.

FIG. 2 uses the abbreviations below:

PA: Activation phase of the sealing means
PI: Non-activation phase of the sealing means 5
S: Opening and closing sequence of the conduit by the element E
O: Opening of the conduit C
F: Closing of the conduit C
Ds: Duration in seconds of an opening and closing sequence
Do: Duration in seconds of an opening
Df: Duration in seconds of a closing.

The activation phase PA is reflected by a mobility of the support means 51, therefore of the element E, relative to the conduit C, while the non-activation phase PI is reflected by the immobility of said support means 51 of the element E relative to the conduit C.

According to the invention, an activation phase PA of the sealing means 5 comprises at least one closing, then opening sequence S of the conduit C. In other words, the activation phase PA comprises at least one closing and opening movement of the element E relative to the conduit C, such that said element E at least partially seals said conduit C, and at least once during a cycle.

According to the invention, for each performed cycle, the duration of an activation phase PA is shorter than 50% of the duration to perform the cycle. Consequently, the additional inactivation phase duration is 50% greater than the duration of the cycle. The advantage of this specificity of the invention is to balance the action time of the sealing to perform effective unclogging and the normal production time without effect of the invention.

More specifically, in combination with the aforementioned duration of a cycle, according to the invention, the duration of an activation phase PA must be less than or equal to 60 s for a 2 min. cycle, 30 s for a 1 min. cycle and 15 s for a 30 s cycle.

In a complementary manner, the duration of a non-activation phase PI is respectively greater than 60 s, 30 s and 15 s.

Each closing and opening sequence S is defined by its amplitude. "Amplitude" refers to the difference between the maximum sealing rate of the sequence and the minimum sealing rate of the same sequence. For example, if the sealing rate, as shown in FIG. 2, varies from 0% (open) to 100% (closed), then the amplitude during the sequence is 100%, or the maximum possible. According to another example, if the sealing rate varies from 20% sealing to 75% sealing of the conduit C, then the amplitude is 75-20=55%. A very low amplitude means that the variation of the sealing is small. On the contrary, a high amplitude means that the variation of the sealing is large, or even maximal.

For example, in the case of the use of a regulating valve on a paper mill method circuit, the variations of the valve openings are very small, typically less than 5%, since the desired effect is above all not to disrupt the pressures in the devices of the method. The reverse is sought in the present invention, where it is important for the device 1 to be able to make it possible to have a high amplitude for a same sequence S.

According to one preferred embodiment, the amplitude of the sealing rate during a sequence S is always greater than 20%. According to a more preferred embodiment, it is greater than 40%. According to a favored embodiment, the amplitude of the sequence S is greater than 60%.

The "nominal sealing rate" refers to the percentage of sealing of the total area of the conduit C by the element E during an inactivation phase PI.

According to one preferred usage mode, the amplitude of the activation phase during the sequence S is always at least 15% greater than the nominal sealing rate applied during the inactivation phase PI.

In other words, the dimensions of the element(s) E and the arrangement on its movable support means 51 make it possible to ensure that, during the performance of a sequence S, the sealing surface by the element E varies significantly relative to the nominal sealing surface, i.e., the percentage of the total area of the conduit C sealed by the element E during an inactivation phase PI.

Lastly, each closing and opening sequence S is defined by its duration Ds and by its sealing rate, also called intensity I.

The duration Ds of a sequence S corresponds to the sum of the duration Df of the movement operation of the element E in the direction of a sealing or closing of said conduit C and the duration of the movement in the other direction, Do, for the opening of the conduit C.

The closing Df and opening Do durations of said conduit C depend on:
- the mobility speed of said support means 51, i.e., the speed at which the element E moves in front of the opening area 6 of the conduit C; and
- the geometric shape of the element E, which may represent a percentage greater or less than the opening area 6 of the conduit C.

According to the invention, it is necessary to guarantee a fast action of the element E, in particular in order to minimize the disruption time of the nominal production of the invention. As a result, the traditional solutions of the shovel valve type controlled by a pneumatic jack are not satisfactory because they are too slow. They would risk lastingly disrupting the normal separating operation of the fluid M. One particular solution of the element E is described later.

In general, according to the invention, for each sequence S, the time necessary to vary the sealing rate between its minimum value and its maximum value, or the duration Df, must remain below 10 seconds, and preferably below 5 seconds, and still more preferably below 2 seconds. Reciprocally, the duration Do must respect the same durations shorter than 10 seconds, preferably 5 seconds, advantageously 2 seconds.

According to one preferred embodiment, the total duration Ds of a closing and opening sequence S according to the invention is less than 20 seconds, preferably less than 10 seconds, and advantageously less than or equal to 4 seconds to allow an acceptable average production, between a maximal production and a lesser production due to the beginning of clogging or nonproduction due to an unclogging operation in progress.

According to the invention, the management means 8 of the control means 7 define the duration of the mobility of the support means 51 and the movement speed of the support means 51, therefore of the element E.

These management means 8 also define the duration of the immobility of the support means 51, therefore of the element E. Thus, the management means 8 make it possible to define the moment where one goes from the activation phase PA to the non-activation phase PI of the sealing means 5, and in particular to define the position of the element E relative to the conduit C during stopping of the support means 51.

The management means 8 control the duration of the non-activation phase PI as well as the duration of the activation phase PA of the sealing means 5.

In other words, the management means 8 control the duration of a cycle and the repetition frequency of said cycle.

According to the invention, said sealing means 5 can be a shovel valve, a ball valve or a butterfly valve, with a special design in order to guarantee a high operating speed and controlled wear despite a very large number of cycles, around 1,000,000 (one million) cycles per year.

Figure 3:
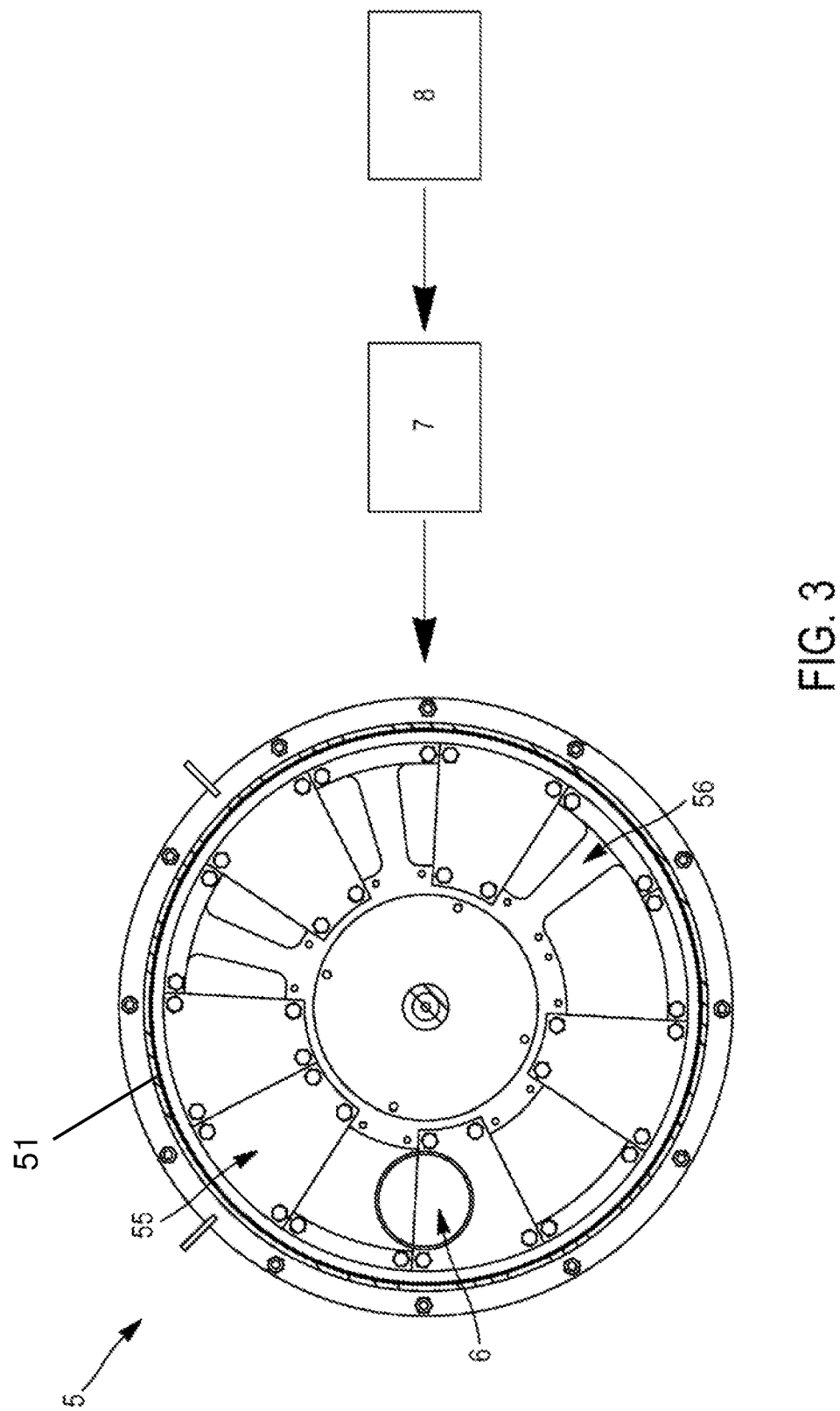
FIG. 3 is a schematic view showing an embodiment of the sealing means 5 according to the invention.

According to one particular embodiment, visible in FIG. 3, the sealing means 5 consist of a rotary disc 56. The disc 56 is made up of a support web 51 and at least one flap 55 for sealing the conduit C, said disc 56 serving as support means 51 for the flap 55.

In other words, these sealing means 5 comprise, as element E, at least said flap 55 able to be in any form. The continuous rotation of the disc 56 drives the continuous rotation of said closing flap 55, the latter gradually sealing the conduit C. The flap 55 is then movable, along this continuous axis, during the process of separating the constituents of the medium M, during the activation phase.

On the contrary, during the inactivation phase, the disc 56 is fixed, and therefore the flap 55 as well. The fixed position of the flap 55 relative to the conduit C is managed owing to the management means 8.

According to this embodiment, the management means 8 are suitable for said flap 55:
- to be movable following a continuous movement over time in order to seal, or not seal, all or part of said conduit C during said activation phase of said sealing means 5, Or to be immobile in a fixed position, sealing or not sealing, in whole or in part, said conduit C, during a non-activation phase of said sealing means 5.

The rotation speed of the disc 56 can be adjusted for example by using, as management means 8, an automaton managing, as control means 7, a variable frequency drive connected to a motor rotating the disc 56.

Furthermore, it is also possible to modulate the sealing rate or the intensity as a function of the shape and number of flaps 55 present on the rotating disc 56.

Indeed, the closing duration Df of the conduit C of the sequence S depends on the number and caliber of the sealing flaps 55 present on the rotating disc 56.

If the number of flaps 55 is high and/or if the caliber of said flaps 55 is greater than the opening area 6 of the conduit C, the closing duration Df of the latter will be longer than for a smaller number and caliber of flaps 55, for a same rotation speed of the disc 56.

Thus, the shape and number of flaps 55 make it possible to adjust the duration of the sealing of the conduit C without modifying the rotation speed of the disc 56.

Thus, depending on the device 1 according to the invention, characteristics of the fluid medium M and the actual or potential appearance of a clump clogging the separating element 3, one will determine the number of sequences S in a cycle, the duration of the activation phase PA and the duration of the non-activation phase PI. The sealing phenomenon, partial or total, is paced by the performance of these cycles before, during or after the separating operation of the constituents of the medium M in the device 1.

The content of a cycle is characterized based on the pressure deviation between P1 and P2 that it will be necessary to obtain to avoid clogging of the separating element 3. This pressure deviation will depend on the nature of the medium M to be separated or the caliber of the perforations 4. The sealing means 5 therefore have the advantage of being able to modify and vary the pressure deviation over the entire interface and near the separating element 3, therefore to cause unclogging of the latter.

In other words, the sealing means 5 have the advantage of being able, by modifying the passage flow rate within the conduit C, to generate a variation of the pressure deviation between P1 and P2 capable of unclogging or improving the unclogging of the separating element 3, during the separating operation. The sealing means 5 make it possible to modify, during the separation, cyclically, the pressure differential at the interface between the medium M and the face 31 of the separating element 3, therefore consequently to lift the clump of medium M able to clog the face 31. Thus, the sealing means 5 make it possible to prevent the clogging or improve the unclogging during the separating operation of the constituents of the medium M through the device 1 of the invention.

The presence, arrangement, design and activation followed by the inactivation according to a determined cycle of the sealing means 5 allow effective unclogging of the entire surface of the separating element 3, during the separating process carried out in the device 1 according to the invention.

The device 1 of the invention therefore makes it possible to avoid the clogging of the separating element 3. The elimination of the clogging phenomenon within the device has the advantage of:

reducing the reject rate R, working with a minimal perforation caliber 4 in order to optimize the quality of the differential separation of the constituents of the medium M, maximizing the selectivity between the accepted parts A and the rejected parts R, not stopping the separating process due to clogging of the separating element 3, working at higher constituent concentrations.

The device 1 of the invention therefore makes it possible to perform unclogging that is adjustable in terms of frequency and duration, and intensity, which is done remotely by activating sealing means 5 present outside the chamber 2 in which the separation process is carried out.

According to one particular embodiment, as indicated in FIG. 4, the variation of the sealing rates may not be limited to values comprised between 0% and 100% sealing of the conduit C. In this particular embodiment, the activation phase PA comprises a sequence S of opening Do 1 and closing Df 1, followed by opening Do 2. As illustrated in FIG. 4, at the beginning of the cycle, during the activation phase PA, the sealing rate of the conduit C by the element E is 30%. A first activation of the sealing means 5 opens the conduit C during a duration Do 1. Thus, the sealing rate by the element E drops to 10%. Then, still in the activation phase, a closing Df 1 by the element E generates an increase in this sealing rate to 90%, then a second opening Du 2 causes it to drop to 30% again. In the inactivation phase, the value of the sealing rate remains 30% until the beginning of the following cycle. Thus, in this particular embodiment, for a cycle, the control means 7 activate the sealing means 5 such that the sealing rate is comprised between sealing rate limit values of the conduit C by the element E that are comprised between 30 and 90%.

It is thus possible, according to the invention, to provide customized adjustment of the applied sealing rates, based on the operating conditions, and above all clogging conditions.

According to one particular embodiment, the device 1 according to the invention may also be equipped with a rotor with blades near the separating element 3 able to lift, through mechanical-hydraulic action, the clump present on the surface 31 of the separating element 3. The presence of the device 1 of the invention makes it possible to work with slower rotors, thereby limiting energy consumption and premature wear of the rotor and/or the separating element 3.

The present invention also relates to an unclogging method implementing the device 1 of the invention comprising the following steps:

Said fluid medium M is deposited on the separating element 3;

a pressure variation is generated at the interface of the separating element 3 so as to unclog the latter, through the activation or non-activation of the sealing means 5 according to a series of cycles at a frequency greater than 0.008 Hz, each cycle including at least one sequence S for closing and opening, total or partial, of at least one conduit C.

The device 1 of the invention is usable in many fields of application, the field of treatment or recycling cellulose fibers, for example from new pulp, packaging boxes, newsprint paper, magazines.

The device 1 of the invention can in particular be used for purification, fractionating, washing or thickening operations, for fluid filtration or in a paper machine.

For the purification operation, the paper is mixed with water, within a pulper, so that the cellulose fibers are placed in suspension. After mixing, the obtained paper pulp contains unwanted elements that must be eliminated. These unwanted elements may for example, in the case of recycled paper, be particles of glue, inks, minerals, staples, etc. To separate the cellulose fibers from the unwanted elements, a purification operation is done in a purifier with a sieve. Said sieve is susceptible to clogging by various constituents of the fluid medium, here water, intended to pass primarily through the perforations. The use of the device 1 of the invention for this purification operation is advantageous to avoid this clogging or improve unclogging.

For the fractionating operation, the aim is to separate, through a sieve, the cellulose fibers based on their size and/or rigidity. With the aim of obtaining a very good separating performance, the perforations of the sieve can be very small, for example holes with a diameter comprised between 0.2 mm and 3 mm or slits with a width comprised between 0.05 mm and 1 mm. The smallness of these perforations makes the separating operation sensitive to the risk of clogging of the sieve, preventing the separating operation from continuing. For this application, it has been noted that a pressure deviation between P1 and P2 comprised between 0.1 and 0.2 bars makes it possible to avoid, in this case, the clogging phenomenon near or at the interface of the sieve. Thus, the use of the device 1 of the invention for this fractionating operation is advantageous to avoid this clogging.

We claim:

1. A method for unclogging, comprising the steps of:
   flowing a fibrous suspension through a conduit and through a closed chamber with a separating element;
   controlling a sequence of a sealing means within said conduit between an opened position and a partially closed position;
   generating a pressure variation at said separating element, during the step of flowing said fibrous suspension, with a frequency of cycles between said opened position and said partially closed position greater than 0.008 Hz, each cycle being comprised of at least one sequence.

2. The method for unclogging, according to claim 1, wherein said frequency of cycles between said opened position and said partially closed position is greater than 0.03 Hz.

3. The method for unclogging, according to claim 1, further comprising the steps of:
   controlling said sealing means between an activation phase and a non-activation phase so as to generate an activation cycle,
   wherein said activation phase corresponds to said sealing means completing at least one sequence between said opened position and said partially closed position, and
   wherein said non-activation phase corresponds to said sealing means stopped at said opened position or said partially closed position.

4. The method for unclogging, according to claim 1, wherein said sealing means comprises:
   an element having a geometric shape in at least partial releasable sealing engagement with said conduit and being comprised of a movable support means.

* * * * *